United States Patent [19]

Chen

[11] 4,145,324

[45] Mar. 20, 1979

[54] COATINGS BASED ON HYDROLYZED EPOXY RESINS

[75] Inventor: Albert C. Chen, East Brunswick, N.J.

[73] Assignee: Mobil Oil Corporation, New York, N.Y.

[21] Appl. No.: 767,006

[22] Filed: Feb. 9, 1977

[51] Int. Cl.$^2$ .................. C08L 61/28; C08L 63/00
[52] U.S. Cl. .................. 260/29.4 R; 260/29.2 EP; 260/31.2 R; 260/31.4 EP; 260/32.8 EP; 260/33.2 EP; 260/33.4 EP; 428/418; 428/460
[58] Field of Search .................. 260/29.4 R, 29.2 EP, 260/31.4 EP, 31.4 R, 33.2 EP, 33.2 R, 32.8 EP, 32.8 R, 31.2 R, 31.2 T, 33.4 EP

[56] References Cited

U.S. PATENT DOCUMENTS

| 3,405,093 | 10/1968 | Walker | 260/47 |
| 3,991,028 | 11/1976 | Irwin | 260/29.4 R |
| 4,026,857 | 5/1977 | Brown et al. | 260/29.4 R |

*Primary Examiner*—Theodore E. Pertilla
*Attorney, Agent, or Firm*—Charles A. Huggett; Hastings S. Trigg

[57] ABSTRACT

Poly-1,2-epoxy resins, such as diglycidyl ethers of bisphenols, are hydrolyzed at high solids content in organic solvents, such as hexoxyethanol. The hydrolyzed epoxy resins are used in coating formulations (aqueous emulsions or solutions) together with curing agent and, optionally, a catalyst for cross-linking.

8 Claims, No Drawings

COATINGS BASED ON HYDROLYZED EPOXY RESINS

BACKGROUND OF THE INVENTION

1. Field of the Invention

This invention is concerned with coating compositions based upon hydrolyzed poly-1,2-epoxy resins.

2. Description of the Prior Art

The preparation of hydrolyzed epoxy resins has been described in U.S. Pat. No. 3,405,093. The process, however, has been carried out at about 35% solids, whereas the process utilized herein is carried out at about 60–90% solids. Insofar as is now known, it has not been proposed to utilize hydrolyzed poly-1,2-epoxy resins in water-based systems (emulsions) or in organic solution systems as coating formulations, particularly for metal containers.

SUMMARY OF THE INVENTION

This invention comprises a coating formulation of (1) an oil-in-water emulsion of a solution of a hydrolyzed diglycidyl ether of a bisphenol, a nonionic surfactant and a curing agent; or (2) a solution of a hydrolyzed diglycidyl ether of a bisphenol and a curing agent in alkoxyethanol or a mixture of alkoxyethanol with alcohols, ketones, carbitols, or their acetates, and, optionally, liquid aromatic hydrocarbon solvents.

DESCRIPTION OF SPECIFIC EMBODIMENTS

Hydrolysis of Poly-1,2-epoxy Resins

The 1,2-epoxy resin can be any polyglycidyl ether of polyhydric organic compounds, especially polyhydric phenols. Particularly preferred are the glycidyl ethers of bisphenols, a class of compounds which are constituted by a pair of phenolic groups linked through an intervening aliphatic bridge. While any of the bisphenols can be used, the compound 2,2-bis-(p-hydroxyphenyl)-propane, commonly known as bisphenol A, is more widely available in commerce and is preferred. While polyglycidyl ethers can be used, diglycidyl ethers are preferred. The most preferred and commercially available poly-1,2-epoxy resins are diglycidyl ethers of bisphenol A. Depending upon the degree of polymerization, the epoxy resins will have an epoxy equivalent weight of between about 500 and about 5,000. It is also within the contemplation of this invention to use a mixture of two or more poly-1,2-epoxy resins in the emulsion coating formulations of this invention, provided each has an epoxy equivalent weight falling within the range of about 500 to about 5,000. The solvents utilizable in the hydrolysis are alkoxyethanols that have the formula $ROCH_2CH_2OH$, wherein R is $C_5$–$C_7$ alkyl, preferably 2-hexoxyethanol.

It has also been found that mixtures of alkoxyethanol with other solvents are utilizable. Such other solvents include $C_4$–$C_6$ alcohols, $C_4$–$C_6$ ketones, $C_5$–$C_{10}$ Carbitols, and acetates of the alcohols, ethoxyethanol, and Carbitols. Such mixtures, however, should contain at least 50 weight percent alkoxyethanol. A preferred combination is 2-hexoxyethanol and n-butanol.

The amount of solvent or solvent mixture to be used should be sufficient to provide a solids content of at least about 60%. In general the amount of solvent or mixture of solvents used will be between about 10 parts and about 60 parts per 100 parts of epoxy resin.

The hydrolysis reaction is catalyzed by acid hydrolysis catalysts. Suitable acids include sulfuric acid, hydrochloric acid, phosphoric acid, alkylphenylpolyoxyethylene phosphate, benzenesulfonic acid, and p-toluenesulfonic acid. Generally, about 0.1 part by weight acid catalyst will be used per 100 parts by weight epoxy resin.

The hydrolysis is carried out at temperatures between about 90° C. and about 130° C. using an amount of water in excess over the stoichiometric amount to effect substantially complete hydrolysis of the epoxy groups. In general, about 5 to 10 parts by weight water per 100 parts by weight of epoxy resin are used. The time of hydrolysis will be between about 4 hours and about 24 hours.

EXAMPLE 1

A solid epoxy resin (diglycidyl ether of bisphenol A) (DGEBA) (200 parts) having an average molecular weight of about 2900 was dissolved in n-hexoxyethanol (90 parts) at 150° C. Hydrolysis was then carried out at 120° C. using water (12 parts) and phosphoric acid (0.5 parts). After eight hours of heating is stirring, the epoxide content of the resin was reduced from 0.44 meq. per g. to 0.05 meq. per g.

EXAMPLE 2

A solid epoxy resin (DGEBA) (200 parts) having an average molecular weight of about 3750 was dissolved in a mixture of n-hexoxyethanol (60 parts) and n-butanol (30 parts) at 130°–145° C. The temperature of the epoxy solution was lowered and hydrolysis carried out using water (15 parts) and an acid catalyst, alkylphenylpolyoxyethylene phosphate (2 parts). After stirring the reactants at 110° C. for 4 hours, the epoxide content of the resin was reduced from 0.31 meq. per g. to 0.07 meq. per g.

EXAMPLE 3

An epoxy resin (DGEBA) (200 parts) having an average molecular weight of 950 was hydrolyzed in n-hexoxyethanol (90 parts) and water (12 parts) using phosphoric acid (1 part) as catalyst under conditions similar to Example 1.

Emulsion Coating Compositions

The emulsion coatings of this invention contain the aforedescribed hydrolyzed poly-1,2-epoxy resins, nonionic surface active agents, curing agents, an acid crosslinking catalyst (optional), alkoxyethanol-containing solvent (as described in the hydrolysis disclosure), and water.

The surfactants used in the emulsions of this invention are non-ionic surface active agents. These surfactants are well known in the art and are readily available commercially. Typical non-ionic surfactants include polyoxyethylene or polyoxypropylene ethers of higher fatty alcohols and alkyl phenols; fatty acid esters of polyglycols and of anhydrosorbitols; and etherified fatty acid esters of anhydrosorbitols. A preferred class of non-ionic surfactants are the polyoxyethylene ethers of polypropylene glycols having the

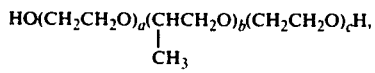

having an average molecular weight between about 3,000 and about 14,000 and an ethylene oxide content of about 10-80 weight percent.

The curing agent can be any conventional curing agent that will not adversely affect the emulsion stability. Typical curing agents include acids, such as novolacs, dibasic carboxylic acids, carboxyl phthalocyanines, and dimer and trimer fatty acids; anhydrides of aliphatic and aromatic polycarboxylic acids; acrylics, such as polyacrylates, polymethacrylates, and polyacrylamides; and amides and miscellaneous nitrogen compounds, such as dicyandiamide and hydrazides. The various curing agents used with epoxy resins are discussed in Lee and Nevill's "Handbook of Epoxy Resins" McGraw-Hill (1967).

The preferred material used to thermoset the coating is conventional aminoplast cross-linking agent. Such agents are well known in the art. There can be used any of the thermosetting alkylated aminoplast resins, such as the urea-aldehyde resins, the melamine-aldehyde resins, the dicyandiamide-aldehyde resins and other aminoplast-aldehyde resins such as those triazine resins produced by the reaction of an aldehyde with formoguanamine, ameline, 2-chloro-4,6-diamino-1,3,5-triazine, 2-phenyl-p-oxy-4,6-diamino-1,3,5-triazine, 6-methyl-2,4-diamino-1,3,5-triazine; 2,4,6-trihydrazine-1,3,5-triazine, and 2,4,6-triethyl-triamino-1,3,5-triazine. The mono-, di-, or trialkyl or mono, di-, or triaryl melamines, for instance, 2,4,6-triphenyltriamino-1,3,5-triazine can be used. Also utilizable are benzoguanamide and hexamethoxymethyl melamine. As aldehydes used to react with the amino compound to form the resinous material, one may use such aldehydes as formaldehyde, acetaldehyde, crotonic aldehyde, acrolein, or compounds which engender aldehydes, such as hexamethylenetetramine, paraldehyde, paraformaldehyde, and the like. It is preferred to use an aminoplast that is poorly water soluble.

Although not essential, it is preferable to use an acid cross-linking catalyst. Suitable catalysts include acid phosphates, such as methyl acid phosphate and butyl acid phosphate; acid pyrophosphates, such as dimethyl acid pyrophosphate; organic acid sulfate esters; and organic sulfonic acids, such as p-toluenesulphonic acid. Preferred catalysts are the acid phosphate and the acid sulfate esters of alkylphenoxypoly(ethyleneoxy)-ethanol that are known as anionic surfactants. The acid catalysts can be used, for instance, in the form of amine or ammonium salts.

The hydrolyzed epoxy resin emulsion coating formulations of this invention have the following composition, all parts being expressed as parts by weight:

| Component | Parts |
| --- | --- |
| Hydrolyzed Epoxy | 100 |
| Resin Solvent (alkoxyethanol containing) | 25-160 |
| Non-ionic surfactant | 2-15 |
| Acid catalyst | 0-2 |
| Curing agent | 1-30 |
| Water | 140-300 |

The hydrolyzed epoxy emulsion coating formulations of this invention, as well as solution coatings, are particularly adapted for coating metal substrates having low energy metal surfaces and lubricated metal surfaces such as aluminum, steel, and tin-plated steel. The rate of application will be sufficient to apply the coating at about 1-20 mg./sq.in. Any of the usual methods can be used, including wiping, spraying, and roll coat application. After application, the coating is set by baking at about 275° F. to about 425° F. for between about 10 minutes and about 30 seconds.

EXAMPLE 4

Hydrolyzed epoxy resin from Example 1 (148 parts, containing 69% solid) and melamine-formaldehyde cross-linking agent (25 parts) were emulsified in water (200 parts) using a surfactant (10 parts) and an acid catalyst (1 part). The surfactant comprises block copolymers of ethylene oxide and propylene oxide, and the acid catalyst comprises alkylphenylpolyoxyethylene phosphate neutralized with aqueous ammonium carbonate. The resulting emulsion had a pH of 7.1, surface tension of 31 dynes per cm., particle size of less than 1 micron, and solid content of 35%.

When the emulsion was applied on lubricated tin-plated steel panels and baked at 350° F. for 4 min., excellent films were produced. At 0.1 mil dry film thickness the solvent resistance was greater than 200 methyl ethyl ketone rubs. After pasteurizing the films at 175° F. for 45 min., there was no blush, and cross-hatched adhesion test showed no lifting of film from the substrate.

EXAMPLE 5

Hydrolyzed epoxy resin from Example 1 (148 parts), melamine-formaldehyde crosslinking agent (20 parts), and one part of an acid catalyst (alkylphenylpolyoxyethylene sulfate preneutralized with dimethylaminopropanol) were emulsified with 12 parts of a surfactant (block copolymer of ethylene oxide and propylene oxide) and 253 parts of water. The resulting emulsion contained 30% solid and had a pH of 5.7. Its viscosity using a Brookfield viscometer at 12 rpm was 400 cps. Thin films (0.1 mil) on lubricated tin plate (baking schedule 350° F./4 min.) had excellent solvent resistance. After pasteurization of the test panels at 175° F. for 45 min., adhesion and blush resistance were also excellent.

EXAMPLE 6

Hydrolyzed epoxy resin from Example 1 (148 parts), melamine-formaldehyde crosslinking agent (20 parts), and an acid catalyst (alkylphenylpolyoxyethylene sulfate, 1 part) were emulsified using 10 parts of a surfactant and 220 parts of water. Drawdown on tinplate and baking at 300° F. for 4 min. produced films having excellent solvent resistance, adhesion, and blush resistance.

In the examples, the following test procedures were used to evaluate films made from the coating formulations of this invention.

MEK Double Rubs

A pad of felt (2" square) soaked in MEK (methylethyl ketone) is rubbed back and forth across the coated surface, while the panel is resting on a firm surface. Each stroke is 2½-3" in length at a uniform pressure of about 900 grams and at a rate of about 100 rubs per minute. The pad is resoaked with MEK after 50 double rubs, or before, if increase in friction makes it necessary. One double rub is considered as one back and forth stroke.

Pasteurized Adhesion (Past. Adh.)

Pasteurization is carried out by immersing the coated panel in water at 170° F. for 45 minutes. Then, the panel is wiped dry with an absorbent towel and a coated area of the panel is cross-hatched with individual score lines approximately 1/16 inch apart. Scotch tape is firmly applied to the cross-hatched area and removed with a quick snap. Adhesion is rated on a scale of 0 to 10 with 10 representing perfect, i.e., no coating was pulled off with the tape. Blush, i.e., clouding of the film is rated on a 0 to 10 scale with 10 representing no blush.

Solution Coating Formulations

In accordance with this invention, the solution formulations contain hydrolyzed poly-1,2-epoxy resin (aforedescribed), curing agent (aforedescribed), solvent, and, optionally, an acid catalyst (aforedescribed).

The solvent can be alkoxyethanol or mixtures of solvents, as described in the hydrolysis disclosure. The amount of alkoxyethanol in the solvent mixture, however, can be as low as about 20 weight percent. The solvent mixture can also contain liquid aromatic hydrocarbon solvents, such as benzene, toluene, and xylene.

The solids portion of the solution coating composition, in parts by weight, can be:

| Component | Parts |
|---|---|
| Hydrolyzed Epoxy Resin | 100 |
| Acid catalyst | 0-2 |
| Curing agent | 1-40 |

In general, the solids content of the solution will be between about 15 weight percent and about 35 weight percent.

EXAMPLE 7

Hydrolyzed epoxy resin from Example 1 (20 parts, 100% solid) was mixed with 4 parts of a melamine-formaldehyde crosslinking agent and dissolved in 80 parts of n-hexoxyethanol. Drawdown of the solution on tinplate and baking at 300° F. for 4 min. produced films (0.1 mil) which showed excellent solvent resistance, adhesion, and blush resistance.

EXAMPLE 8

Identical to Example 7 except that 0.1 part of an acid catalyst (alkylphenylpolyoxyethylene sulfate) was added to the solution. Curing could be effected at 275° F. for 4 min. to give films whose properties were comparable to those of Example 7.

EXAMPLE 9

Hydrolyzed epoxy resin from Example 1 (30 parts) and a polymeric urea-formaldehyde crosslinking agent (8 parts) were dissolved in a mixed solvent comprising ethoxyethanol acetate (8 parts), toluol (25 parts), methyl ethyl ketone (20 parts), methyl isobutyl ketone (5 parts) and n-butanol (4 parts). The solution was applied on aluminum and baked at 340° F. for 2 min. The films showed excellent solvent resistance, adhesion, and blush resistance.

Although the present invention has been described with preferred embodiments, it is to be understood that modifications and variations may be resorted to, without departing from the spirit and scope of this invention, as those skilled in the art will readily understand. Such modifications and variations are considered to be within the purview and scope of the appended claims.

What is claimed is:

1. A coating formulation of:
   (a) an oil-in-water emulsion consisting essentially of a solution of a hydrolyzed poly-1,2-epoxy resin, a non-ionic surfactant, a conventional curing agent, and water; or
   (b) a solution consisting essentially of a hydrolyzed poly-1,2-epoxy resin and a conventional curing agent in alkoxyethanol or a mixture of alkoxyethanol with alcohols, ketones, carbitols, or acetates of alcohols, ethoxyethanol or carbitols.

2. A coating formulation consisting essentially of an oil-in-water emulsion of a solution of hydrolyzed diglycidyl ether of a bisphenol, a non-ionic surfactant, a conventional curing agent, and water.

3. The coating formulation of claim 2 in addition to an acid catalyst.

4. The coating composition of claim 3, wherein said nonionic surfactant is a block copolymer of ethylene oxide and propylene oxide and said curing agent is a melamine-formaldehyde cross-linking agent.

5. A coating composition consisting essentially of a solution of a hydrolyzed diglycidyl ether of a bisphenol and a conventional curing agent in a solvent which is an alkoxyethanol or a mixture of alkoxyethanol with at least one alcohol, ketone, carbitol, or acetate of alcohols, ethoxyethanol, or carbitols.

6. The coating composition of claim 5, wherein said curing agent is a melamine-formaldehyde crosslinking agent and said solvent is n-hexoxyethanol.

7. The coating composition of claim 6 containing an acid catalyst.

8. The coating composition of claim 5, wherein said curing agent is a urea-formaldehyde crosslinking agent and said solvent is a mixture of ethoxyethanol acetate, toluol, methyl ethyl ketone, methyl isobutyl ketone and n-butanol.

* * * * *

UNITED STATES PATENT OFFICE
CERTIFICATE OF CORRECTION

Patent No. 4,145,324  Dated March 20, 1979

Inventor(s) Albert C. Chen

It is certified that error appears in the above-identified patent and that said Letters Patent are hereby corrected as shown below:

Column 2, line 64, after "having the" insert --- structure ---.

Signed and Sealed this

Twentieth Day of November 1979

[SEAL]

Attest:

RUTH C. MASON  
Attesting Officer

LUTRELLE F. PARKER  
Acting Commissioner of Patents and Trademarks